(12) United States Patent
Herwig

(10) Patent No.: US 7,202,784 B1
(45) Date of Patent: Apr. 10, 2007

(54) ANTI-JAMMING DETECTOR FOR RADIO FREQUENCY IDENTIFICATION SYSTEMS

(75) Inventor: Nathaniel Christopher Herwig, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 204 days.

(21) Appl. No.: 10/869,157

(22) Filed: Jun. 16, 2004

(51) Int. Cl.
*G08B 13/14* (2006.01)

(52) U.S. Cl. .............. 340/568.1; 340/10.1; 340/541; 340/572.8; 340/5.92; 340/825.36

(58) Field of Classification Search ............ 340/568.1, 340/572.1, 10.1, 10.5, 10.2, 5.92, 5.9, 572.3, 340/5.1, 825.36, 825.49, 10.3, 10.4, 10.42, 340/5.8, 572.8, 541
See application file for complete search history.

(56) References Cited

U.S. PATENT DOCUMENTS

| | | | | |
|---|---|---|---|---|
| 3,961,323 A | * | 6/1976 | Hartkorn | 340/539.1 |
| 5,777,561 A | * | 7/1998 | Chieu et al. | 340/10.32 |
| 5,822,714 A | * | 10/1998 | Cato | 702/108 |
| 5,950,110 A | * | 9/1999 | Hendrickson | 455/1 |
| 5,995,019 A | * | 11/1999 | Chieu et al. | 340/10.32 |
| 6,195,006 B1 | * | 2/2001 | Bowers et al. | 340/572.1 |
| 6,566,997 B1 | * | 5/2003 | Bradin | 340/10.2 |
| 6,600,418 B2 | * | 7/2003 | Francis et al. | 340/572.1 |
| 6,693,511 B1 | * | 2/2004 | Seal | 340/10.1 |
| 6,970,070 B2 | * | 11/2005 | Juels et al. | 340/10.1 |

* cited by examiner

*Primary Examiner*—Daniel Wu
*Assistant Examiner*—Daniel Previl
(74) *Attorney, Agent, or Firm*—Priest & Goldstein, PLLC

(57) ABSTRACT

Systems and techniques for identifying the presence of a jamming signal impairing the operation of an RFID reader. An RFID reader includes a signal strength detector that detects and measures the signal strength of signals within a prescribed frequency range typical of that used by RFID devices. If a signal within the frequency range and exceeding a predetermined maximum strength is detected, the reader identifies the presence of a jamming signal impairing the proper operation of the reader. The reader takes appropriate action upon identification of a jamming signal, for example issuing a local alert or alarm, or sending a message to a central security station, which may then take appropriate action in response to the message, such as alerting appropriate personnel, sounding alarms or securing exits.

18 Claims, 3 Drawing Sheets

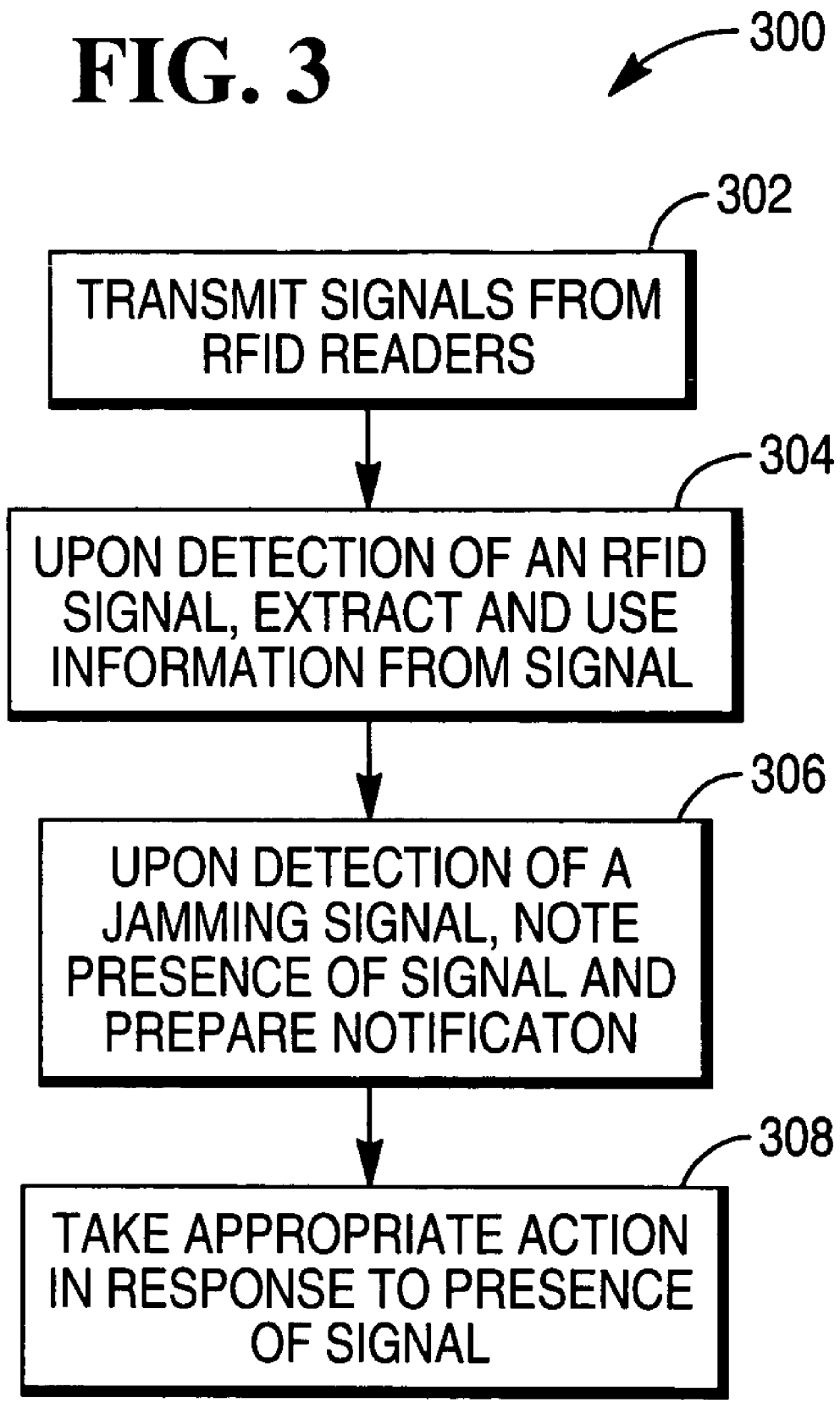

ANTI-JAMMING DETECTOR FOR RADIO FREQUENCY IDENTIFICATION SYSTEMS

FIELD OF THE INVENTION

The present invention relates generally to improvements to radio frequency identification (RFID) systems used for control of goods. More particularly, the invention relates to systems and techniques for detecting and preventing the use of radio frequency energy to disable or impair the operation of an RFID system.

BACKGROUND OF THE INVENTION

Radio frequency identification (RFID) systems offer the possibility of inexpensive and efficient management of goods, with applications in inventory control and retail checkout, for example. Each item in an inventory of items, for example in a retail store or a warehouse, may be equipped with an RFID tag, that is, a tag containing an RFID device. The RFID device emits a signal that supplies information about the product to an RFID reader. The information may include product identification, such as manufacturer and item identifiers, such as those provided by a standard universal product code (UPC) bar code. The information may also include a unique serial number, so that each individual item may be easily identified by a reader. Typical RFID readers broadcast a radio frequency (RF) signal. Tags within the range of the reader return a signal to the reader, typically in the form of modulated backscatter of the signal emitted by the reader.

A reader may be placed at a desired inventory control point, such as a retail checkout station or an entrance to or exit of a retail location, warehouse or other area where goods are located. Tags coming within range of the reader are powered by an RF signal emitted by the reader, and transmit tag information which is detected by the reader. The information detected by the reader may be used in operations involving the item or items whose information was detected. Such operations may include entry of a product in a transaction, such as a retail checkout, where items are entered into a transaction record and listed on a receipt. Operations may also include logging the entry or exit of an item from a physical location, for example when items enter or leave a warehouse. The use of RFID in the management of goods offers fast and efficient control of goods.

For example, a customer might bring a cart full of RFID embedded goods to a checkstand, which would sense product identification information for each product, enter each product into a transaction and present the customer with a list of goods in the transaction and a transaction total. A warehouse inventory could be continuously updated by one or more RFID readers located in the warehouse and continually sensing RFID signals from goods located in the warehouse. An RFID reader located at an entry or exit point of a location could record the passage of goods through that location, and could secure the entry or exit point to prevent the unauthorized exit of an item if the item.

The use of RFID devices for management of goods can be expected to allow for a significant reduction in the labor required to enter transactions and to prevent the unauthorized removal of goods. If each item transmits an identifying code that can be detected by a reader, tracking and control of the item may be performed automatically. However, the use of automated equipment to control inventory invites attempts by unscrupulous persons to defeat the automated equipment. One particular vulnerability exhibited by prior art RFID systems is the possibility that a relatively powerful radio frequency (RF) transmitter could overwhelm an RFID reader, rendering it incapable of detecting emissions emanating from an RFID device. A thief who secreted such a device on his or her person or placed it in the vicinity of a reader could hide RFID tagged goods and leave a retail store carrying the goods, without having the goods detected by RFID based checkout or security systems.

There exists, therefore, a need for systems and techniques to prevent the effective disabling of an RFID detector through the use of an RF emitter used to overwhelm the detector and prevent the proper detection of signals transmitted by RFID devices.

SUMMARY OF THE INVENTION

An RFID detection system according to an aspect of the present invention includes an RFID reader communicating with RFID devices, such as RFID tags, embedded in or otherwise securely attached to goods whose movement is to be detected. The RFID readers are preferably deployed in an enclosed area with the readers arranged to provide coverage at all entrances to and exits from the area, as well as any other areas where it is desired to perform transactions, such as retail checkout. Each of the readers is adapted to communicate with RFID tags by broadcasting RF energy to power tags coming within range of the reader and receiving RF energy transmitted by the tags, suitably in the form of backscatter emitted by the tags. Each reader transmits energy within a predetermined frequency range and receives transmissions within a predetermined frequency range. Each reader is also suitably equipped with an RF detector, for detecting the presence of RF energy within the reception frequency range of the reader, but having a power level exceeding a predefined level, the level being above that expected to be emitted by an RFID tag.

A more complete understanding of the present invention, as well as further features and advantages of the invention, will be apparent from the following Detailed Description and the accompanying drawings.

BRIEF DESCRIPTION OF THE DRAWINGS

FIG. 3 illustrates a process of RFID detection and reading according to an aspect of the present invention.

DETAILED DESCRIPTION

Figure 1:
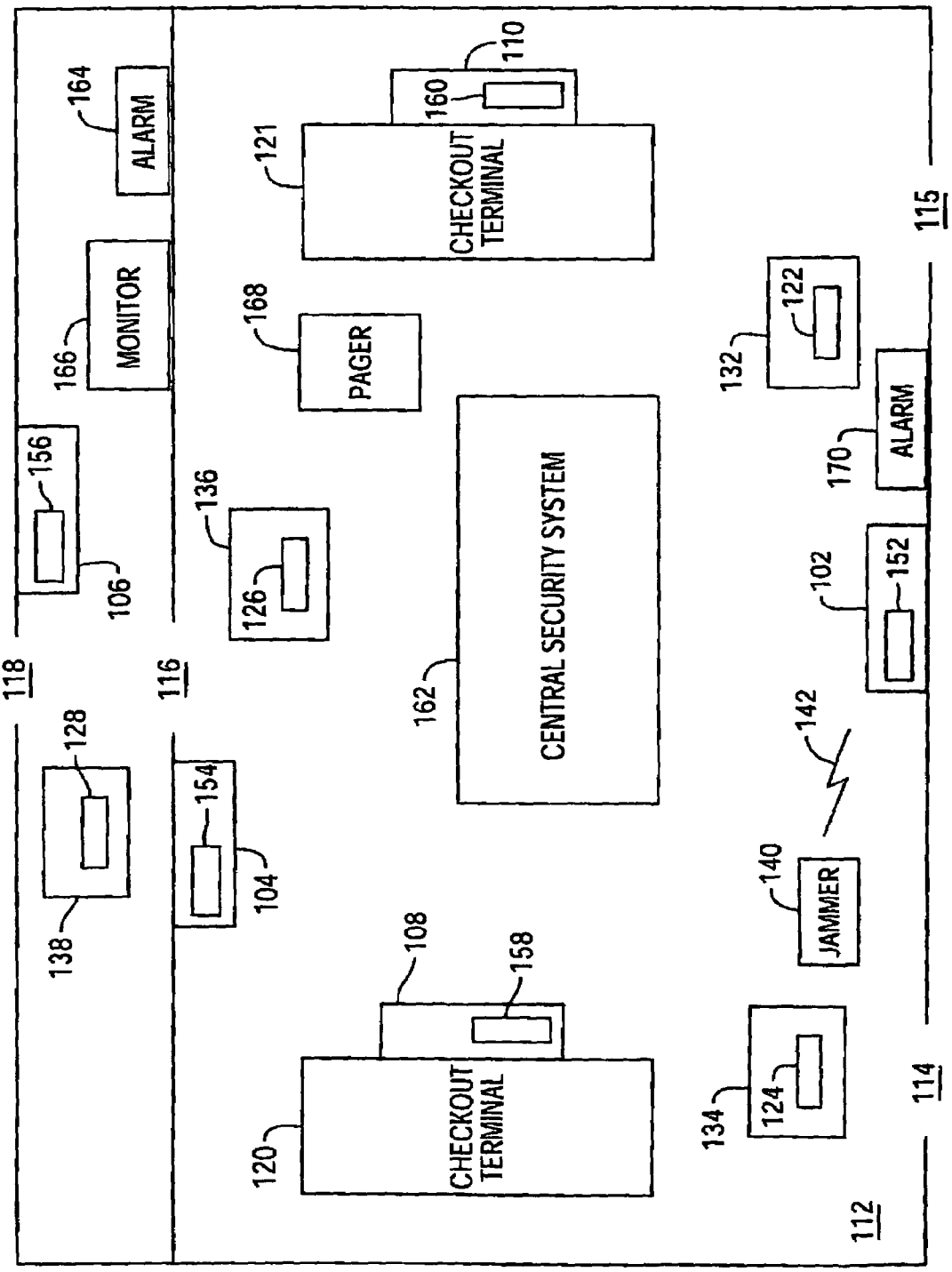
FIG. 1 illustrates an RFID system according to an aspect of the present invention.

FIG. 1 illustrates a system 100 for management and control of goods according to an aspect of the present invention. The system 100 includes a plurality of RFID readers 102, 104, 106, 108 and 110, shown here as deployed in an enclosed location such as a retail establishment 112, so as to provide coverage at main entrances 114 and 115, a rear entrance 116, a stockroom entrance 118 and checkout terminals 120 and 121. The readers 102–110 are suitably deployed so as to provide coverage at each access point to the establishment 110, as well as each location where it is desired to facilitate a transaction, such as the checkout terminals 120 and 121. Each of the readers 102–110 is able to detect and receive information from RFID devices such as RFID tags 122, 124, 126 and 128. The tags 122–128 are attached to the products 132, 134, 136 and 138, respectively.

Each tag transmits identification information to a reader, with the tag preferably communicating a product identifier, such as a product identification code, to the reader, as well as a unique serial number. Each tag may suitably be a passive device, receiving and modulating the RF signal emitted by the reader and returning a signal to the reader in the form of modulated backscatter of the broadcast signal. Each reader typically broadcasts a signal at a power of from one to several watts, with the frequency of the signal depending on the operating frequency of the tags with which the reader is employed. Typical operating frequencies of RFID tags are 125–134 kilohertz (kHz), a 13.56 megahertz (MHz) band, 860–960 MHz and a 2.45 gigahertz (GHz) band. The readers deployed in a particular environment operate at one of these frequency ranges or another frequency range employed by the tags used in that environment. Alternatively, the readers and the tags may be adapted so that a reader and a tag communicate through queries and responses, with the reader asking for the identification information from the tag and the tag providing the information in response. In addition, the readers and the tags may be adapted so as to allow for additional communication, such as a command from the reader for the tag to cease communication once the reader has received and logged the identification information from the tag.

Suitably, each of the checkout terminals 120 and 121 is within the coverage area of a single reader, in order to simplify the association of goods with a transaction performed using the terminal. If one reader provides coverage for more than one terminal, goods will be detected at each terminal by the same reader, and it will be more difficult to associated detected goods with the correct transaction. Here, the terminal 120 is within the coverage area of the reader 108 and the terminal 121 is within the coverage area of the reader 110. Readers that are not deployed so as to facilitate a transaction, such as readers that are deployed near an entrance or exit, may be placed so as to provide coverage for multiple locations of interest, because items detected by such a reader do not need to be associated with one another, as do items that are to be purchased in a single transaction. For example, the reader 102 provides coverage for the entrances 114 and 115 and detects all tags approaching those entrances. It is not necessary for the reader 102 to identify an item as approaching the entrance 114 or the entrance 115.

Each of the tags 124–132 operates at relatively low power. Therefore, each of the readers 102–110 is adapted to receive low power signals at the frequency or frequencies and following the protocol prescribed for the tags 124–132. If a higher power jamming signal occurs within the range of one of the readers 102–110 and at the same frequency as that prescribed for a tag, the jamming signal may overwhelm the signal transmitted by the tag, so that the reader is rendered effectively blind to the presence of the tag. A jammer 140, transmitting a jamming signal 142, is illustrated here as being located in the vicinity of the reader 102. The jammer 140 may be carried by a person who intends to steal a product, or may be left in the vicinity of a reader, such as the reader 102, which it is desired to disable. The presence of the jammer 140 interferes with the ability of the reader 102 to detect tags within its range, and therefore raises the possibility that goods bearing tags may be illicitly removed through the entrance 114 or the entrance 115.

If a customer has the product 134 hidden on his or her person, the jammer 140 will overwhelm the transmissions emitted by the tag 124. The reader 102 will therefore be unable to detect the tag 124, raising the possibility that a thief will be able to remove the product 134 without detection.

Therefore, each of the readers 102–110 includes a signal strength detector 152–160, respectively. A signal strength detector such as the detector 152 senses RF signals that are likely to interfere with the proper operation of a reader and evaluates the signal strength of such signals. Preferably, the signal strength detector 152 detects signals within a relatively narrow frequency range corresponding to those detectable by the RFID reader 102 as emitted from the RFID tag 124. The frequency range detected by the detector 152 is restricted in order to avoid spurious detection of other signals that will not interfere with the operation of the reader 102. Such signals may, for example, be emitted by cellular telephones, pagers, wireless text messaging devices, wireless personal digital assistants, and the like.

If the detector 152 detects a signal within a predetermined frequency range and exceeding a predetermined threshold, the detector 152 identifies a jamming signal and issues an alert signal. The alert signal may be transmitted to a central security station 162, and identifies the detector 152 as the location where the jamming signal was detected. The central security station 162 may perform suitable actions in response to the alert signal, such as providing a visual or audible notification to a guard or manager using an alarm 164 or a monitor 166, issuing an alert to a guard or manager through a pager or other wireless device 168, activating an audible or visual alarm 170 in the vicinity of the detector 152 or securing one or more entrances to the retail establishment 112.

It will be recognized that the teachings of the present invention are not limited to use with tags and readers such as those described above. The system 100 illustrated in FIG. 1 and discussed above employs passive RFID tags. However, different designs may be used for RFID tags. For example, an RFID tag may include an active transmitter powered by a battery installed in the tag. In addition, a tag may be designed so that it does not receive commands from a reader, but simply broadcasts an identifying signal. A reader employing a signal strength detector such as those mentioned above can easily be adapted to operate with such tags and to detect and identify jamming signals directed toward interfering with the use of such tags.

Figure 2:
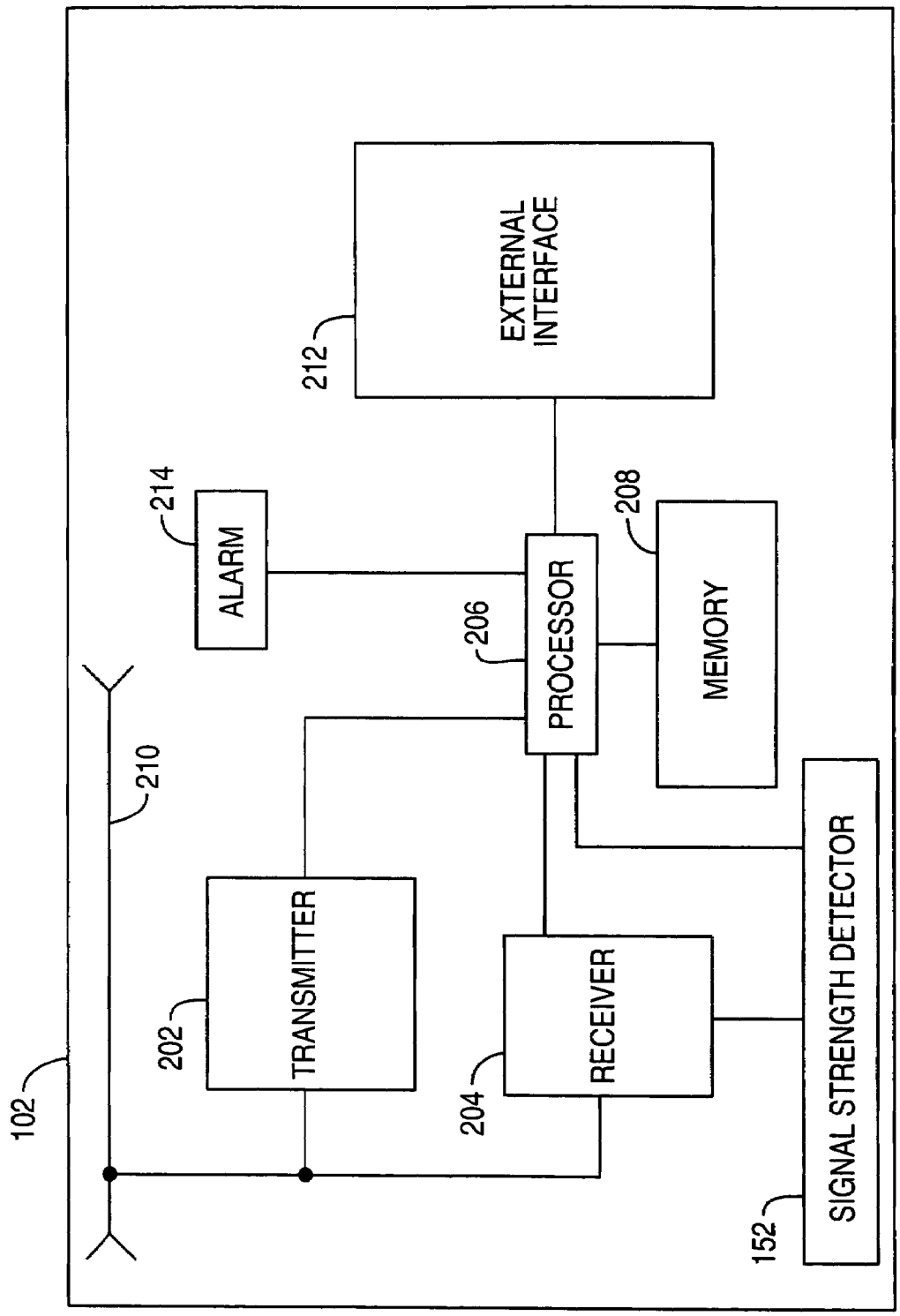
FIG. 2 illustrates an RFID reader according to an aspect of the present invention.

FIG. 2 illustrates additional details of the RFID reader 102. The reader 102 includes a transmitter 202, a receiver 204, a processor 206, memory 208 and an antenna 210. The reader 102 uses the transmitter 202 to broadcast an RF signal to RFID tags in its vicinity, in order to provide power to the tags and, if desired, issue commands to the tags. The reader 102 uses the receiver 204 to receive transmissions from tags within its vicinity. The transmissions preferably follow a prescribed format for the transmission of digital information and include information such as a product identifier and a tag serial number. The processor 206 and the memory 208 are used to manage operation of the reader 102, to prepare signals and commands to be sent using the transmitter 204 and to interpret signals received using the receiver 204 and to extract and store information provided by the signals. The reader 102 also includes an external interface 212, for communicating with other devices in the establishment 112, such as the central security station 162, for example.

The reader 102 further includes signal strength detector 152, which is connected to an antenna 210. The signal strength detector 152 receives signals captured by the antenna 210 as inputs, and detects and evaluates signals within a prescribed frequency range which is the frequency range employed by RFID tags used with the system 100. If a signal is detected within the frequency range and having a strength exceeding a predetermined threshold, such as 500 mW, the signal strength detector passes a notification to the processor 206, indicating that a signal is present that renders the reader 102 ineffective. The processor 206 then prepares alert information and passes it to the interface 212, which transmits the alert information to the central security station 162, for example through a wired connection or through transmission on a frequency separate from that used for communication with the RFID tags. The processor 206 may also prepare a local alert, which is passed to the interface 212, which then activates a local alarm, for example an alarm 214 embedded in the reader 102.

In many cases, installations employ other devices that employ frequency ranges shared by RFID tags. For example, many cordless telephones and wireless data devices, such as wireless LAN devices, utilize frequencies within the 860–960 MHz range and the 2.45 GHz band. In designing an installation, it is important to position readers so as to minimize interference by other devices. If a cordless telephone or a wireless local area network router, for example, is used too close to an RFID reader sharing the frequency range of the cordless telephone, the signal transmitted by the cordless telephone may overwhelm RFID signals within the vicinity of the reader. Moreover, even if a system is initially designed so as to minimize interference, introduction of new devices or relocation of existing devices may cause interference. Therefore, the reader 102 and similar readers may advantageously be designed so as to allow for the recording of details of interfering signals. In such a design, the detector 152 may identify the frequency, power and other characteristics of an interfering signal and relay this information to the central security station 162, where the information is recorded for examination. The station 162 may suitably format the information for examination, for example in the form of a graph or chart. An operator may examine information for one or more readers in order to help determine the identities and locations of interfering devices and plan placement of RF emitting devices having the potential to interfere with the RFID, so as to reduce the potential of interference from those devices.

FIG. 3 illustrates the steps of a process 300 of operating an RFID system according to an aspect of the present invention. At step 302, a plurality of RFID readers deployed in an installation transmit signals within a predetermined frequency range, in order to communicate with RFID devices, such as RFID tags, embedded in or otherwise attached to goods whose movement is to be monitored and controlled. At step 304, upon detection by a reader of a signal, such as a modulated backscatter signal, emitted by an RFID tag, information is extracted from the signal and appropriate action is taken in response to the information. Such action may include, for example, entering a product in a transaction, logging the entry of or exit of an item, or taking steps to prevent unauthorized removal of an item, for example sounding an alarm or securing an exit door. At step 306, upon detection by a reader of a jamming signal likely to render the reader unable to reliably detect and read an RFID signal, the reader notes the presence of such a signal and prepares a notification of the presence of the signal. A signal may typically be identified as a jamming signal when it falls within a predetermined frequency range that is the same range as is used by RFID tags in the installation, and when it has a power level more than a predetermined maximum. At step 308, appropriate action is taken by the reader in response to detection of the signal. Such action may include transmitting a notification to a central security station, sounding a local alarm controlled by the reader, or the like. A notification to a central security station may include information describing the signal, such as frequency and power of the signal, with samples taken over time, in order to provide information for use in correcting interference caused by the configuration of the installation. At step 310, action is taken in response to notifications provided by the reader, for example alerting a security officer or manager, sounding alarms, securing exits or logging information describing the interfering signal.

While the present invention is disclosed in the context of a presently preferred embodiment, it will be recognized that a wide variety of implementations may be employed by persons of ordinary skill in the art consistent with the above discussion and the claims which follow below.

I claim:

1. A radio frequency identification (RFID) reader, comprising:
   a receiver for detecting and receiving signals emitted from one or more RFID devices;
   a signal strength detector for determining strength of a detected signal within a prescribed frequency range typical of frequency ranges used by the RFID device and generating a signal strength detection signal indicating the signal strength; and
   a processor for receiving the signal strength detection signal and determining whether the signal strength detection signal is indicative of detection of a signal strength above a prescribed maximum established to detect jamming signals, the processor being operative to identify a detected signal as a jamming signal if the signal strength detection signal indicates a signal strength above the prescribed maximum, the processor being further operative to select an appropriate response to the jamming signal from a plurality of available responses.

2. The reader of claim 1 further comprising: a transmitter to broadcast a radio frequency (RF) signal that is modulated by one or more RFID devices within range.

3. The reader of claim 2, wherein the receiver detects modulated backscatter signals emitted by the one or more RFID devices and extracts identifying information from the RFID devices.

4. The reader of claim 3, wherein the reader is operative to issue an alert upon detection of a jamming signal, the alert indicating detection of a jamming signal and identifying the reader detecting the jamming signal.

5. The reader of claim 4, wherein the reader is operative to sound a local alarm upon detection of a jamming signal.

6. The reader of claim 1 wherein the transmitter broadcasts the radio frequency signal at a power of at least 1 W, and wherein said prescribed maximum is at least 500 mW.

7. A system for management and tracking of goods comprising:
   a plurality of radio frequency identification (RFID) devices, each of the devices being operative to emit an RFID signal including product identification information for an associated product and device identification information specifically identifying the device;
   a plurality of RFID readers operative to detect signals received from RFID devices, each of the readers being further operative to measure a signal strength of a signal within a predetermined frequency range typical of that within which the RFID devices operation and to identify a signal as a jamming signal interfering with proper operation of the reader if the signal exceeds a predetermined maximum signal strength, each reader being operative to select an appropriate response to identification of a signal as a jamming signal, the response being one of a plurality of available responses.

8. The system of claim 7, wherein each of the readers is operative to issue an alert upon identification of a jamming signal, each alert identifying the reader issuing the alert.

9. The system of claim 8, further comprising: a central security station for receiving an alert from a reader and taking appropriate action in response to the alert.

10. The system of claim 9, wherein the action taken by the central security station include one or more of issuing an audible or visual alarm, alerting a responsible employee and securing an entrance or exit.

11. The system of claim 10, wherein each of the readers is operative to provide detailed information about a detected jamming signal to the central security station and wherein the central security station is operative to store the information for examination in order to provide insight into potential interference problems affecting the operation of the system.

12. The system of claim 9 wherein the central security station records details of interfering signals, said details including frequency and power, and said details taken from samples taken over time.

13. A method of management and tracking of goods identified by radio frequency identification (RFID) devices, comprising:

communicating with a plurality of RFID devices in order to receive information from the devices;

measuring the strength of each received signal within a prescribed frequency range typical of the range used by the RFID devices;

if a received signal within the prescribed frequency range exceeds a predetermined maximum established to detect jamming signals, identifying the presence of a jamming signal; and selecting an appropriate response to the identification of the jamming signal, the response being selected from a plurality of available responses.

14. The method of claim 13, wherein the step of identifying the presence of a jamming signal is followed by a step of taking appropriate action in response to detection of the jamming signal.

15. The method of claim 14, wherein the step of taking appropriate action includes one or more of issuing a local alarm and issuing an alert to a central security station to allow action by the central security station.

16. The method of claim 15, wherein the action by the central security station includes one or more of issuing an audible or visual alarm, alerting an appropriate employee and securing an entrance or exit.

17. The method of claim 16, further comprising: storing detailed information relating to each jamming signal detected in order to allow for later examination in order to provide insight into possible interference problems affecting reception of RFID signals.

18. The method of claim 13 further comprising:

recording details of interfering signals including frequency and power, said details taken from samples over time.

* * * * *